INVENTOR
HEINZ-DIETER NEUBER
BY
ATTORNEY.

INVENTOR
HEINZ-DIETER NEUBER
BY
ATTORNEY.

United States Patent Office 3,212,265
Patented Oct. 19, 1965

3,212,265
SINGLE STAGE HYDRAULIC TORQUE CONVERTER WITH HIGH STALL TORQUE RATIO AND UTILITY RATIO
Heinz-Dieter Neuber, Malsch, Karlsruhe, Germany, assignor to Elba-Werk, Ettlinger Baumaschinen- und Hebezeugfabrik G.m.b.H., Ettlingen, Baden, Germany, a corporation of Germany
Filed Apr. 13, 1964, Ser. No. 359,354
Claims priority, application Germany, Apr. 13, 1963, E 24,678
5 Claims. (Cl. 60—54)

The present invention relates to a single stage hydraulic torque converter with a high stall torque ratio and utility ratio.

In the design of hydraulic converters, a power transmission is aimed at with as broad an efficiency curve as possible. Now in this connection, in order to compare two different types of converters, the term of "utility ratio" is used. This term is defined as the variance of the turbine-speeds (number of revolutions of the turbine), at which the efficiency curve cuts the 70% efficiency line. Employing the "utility ratio", it is possible to compare numerically the operating ranges of different converter types with one another and to judge their qualities. Furthermore, the definition of the term "utility ratio," which is actually the multiplication of the torque between the 70% efficiency points, also shows that the size of the "utility ratio" gives also the size of the step for a gearing which is secondarily connected up to the converter, provided the view that an operation down to 70% degree of efficiency can be supported. In general practice, it is usual to select the steps of the secondary gearing in such a manner that the degree of efficiency of the converter does not drop below 75%.

Three-stage hydraulic torque converters are known, which have a starting torque ratio of 4.5:1 to 6.0:1 and a utility ratio of 3.25:1 to 3.85:1. Furthermore, hydraulic torque converters with a starting torque ratio of 5:1 to 7:1 and a utility ratio of 3.2:1 to 4.0:1 are described in the literature, wherein the operational ratio refers to the 70%-mechanical efficiency line.

Aside from the fact that three-stage torque converters are cumbersome in the constructive sense, the torque input of the pump increases strongly during low numbers of revolutions of the turbine, and it has in addition also an appreciable torque input during the non-loaded condition of the turbine.

In the above-mentioned one-stage torque converters, however, the torque input of the pump or impeller is substantially flat over the entire range of the number of revolutions of the turbine, with the exception of a slight drop at both ends.

For a long line of applications, which require a high operational adaptation, as for instance, soil moving devices, in which a hydrostatic pump is connected to the driving motor for the production of the pressure oil for the operation of the working utensils, the described torque input characteristic curves are not suitable, since, due to the additional power input of the hydrostatic pump, which is required in particular during the starting operation, the driving machine, generally an internal combustion engine, is very strongly pressed. If, however, in case of an unloaded turbine, pressure oil is required for the working utensils, the torque input should be as low as possible in this operating condition, which is, however, not the case.

It is, therefore, one object of the present invention to provide a one-stage hydraulic torque converter, in the hydraulic circuit of which, in the conventional manner, the working fluid flows through the pump or impeller and the turbine one after another radially outwardly, in which, however, the blade system and the blade free spaces are designed such, that during a constant number of revolutions of the drive, a starting torque ratio of 7.6:1 to 8.5:1, a utility ratio of 4.2:1 to 4.7:1 is obtained, and that the torque input of the pump or impeller drops strongly at both ends of the range of the number of revolutions of the turbine.

It is another object of the present invention to provide a one-stage hydraulic torque converter with a high starting and utility ratio, wherein this problem is solved by a combination of the following characteristics:

(1) The combination of a pump or impeller grid with the grid constant (this is the characteristic diameter/number of blades×blade length of $c_P = 0.31$ to $0.32$ with a turbine grid having the grid constancy $c_T = 0.3$ to $0.31$ and a guide wheel grid having the grid constant of $c_L = 0.18$ to $0.20$.

(2) The grid widths and blade widths coordinated to this grid combination amount to:

Grid width—
   Pump (impeller) _____ $g_P = 0.095D$ to $0.105D$.
   Turbine _____ $g_T = 0.049D$ to $0.053D$.
   Guide wheel _____ $g_L = 0.159D$ to $0.163D$.
Blade width—
   Pump _____ $s_P = 0.114D$.
   Turbine _____ $s_T = 0.12D$.
   Guide wheel _____ $s_L = 0.111D$.

whereby D is the characteristic diameter of the outlet edges of the impeller blades.

(3) The blade-free space between the guide wheel and the pump or impeller wheel is, preferably, designed such, that the passing cross-section is widened up to a predetermined point by a factor 1.03 to 1.05 and that a cylindrical entrance branch having a preferable length of 0.045D to 0.048D follows this point and that the following channel up to the pump impeller wheel entrance is maintained constant as to its cross-section.

By the combination of the characteristics stated above under 1 and 2 in combination with the characteristics stated under 3, it is brought about that the circulation at the starting point into the pump or impeller grid takes place with a movement value and with such minimum circulation losses, that the actual change of this movement value in the turbine is so large, that a starting ratio of 7.6:1 to 8.5:1 occurs. Furthermore, the formation of the grid systems in combination with the formation of the blade-free space between the guide grid and the pump grid brings about, that the torque input of the pump or impeller increases strongly from the ratio of the number of revolutions $(n_T/n_P) = 0$ to $0.2$, then remains nearly constant up to the coupling point $(M_P = M_T)$ and then again drops strongly.

In a torque converter in accordance with the present invention, the turbine blades, which are equipped with thick, well rounded entrance edges and strongly curved skeleton lines, which turbine blades are disposed in the turbine grid with a grid constant $c_T = 0.3$ to $0.31$, a grid width of $g_T = 0.049D$ to $0.053D$ and a blade width $s_T = 0.12D$, in combination with the above-stated characteristics, so that the converter efficiency runs very flat over a very wide range of the ratio of the number of revolutions $(n_T/n_P)$ in the maximum height of about $\eta = 86\%$.

With these and other objects in view, which will become apparent in the following detailed description, the present invention will be clearly understood in connection with the accompanying drawings, in which.

Figure 1:
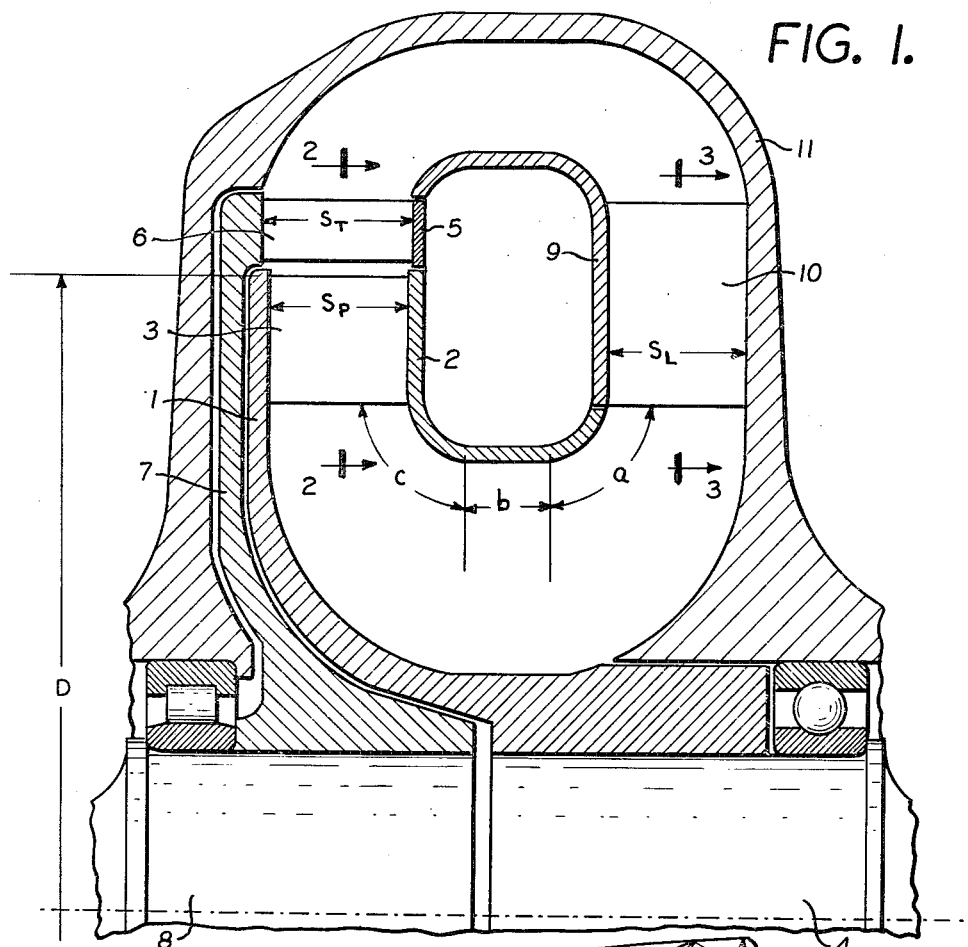
FIGURE 1 is an axial section of the torque converter of the present invention showing the upper portion above the rotary axis only.
Figure 2:
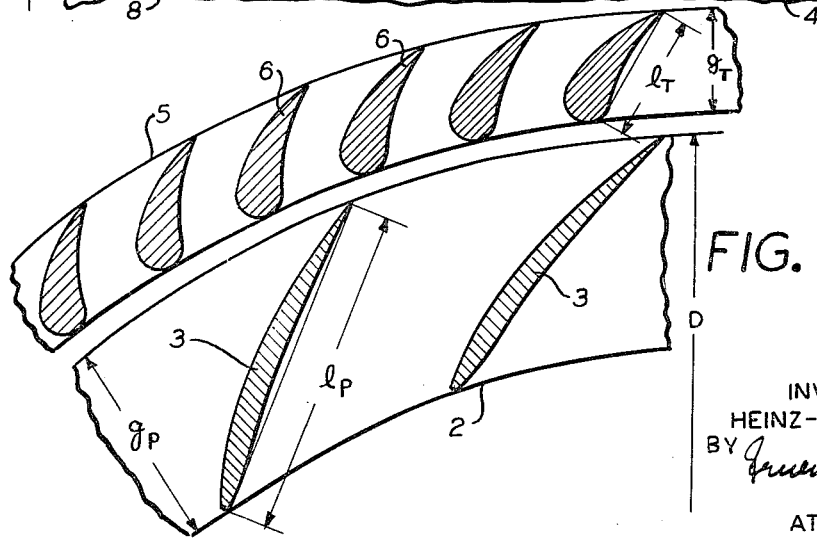
FIG. 2 is a section, on an enlarged scale, of the pump or impeller grid with the pump or impeller blades and the turbine grid with the turbine blades along the lines 2—2 of FIG. 1.
Figure 3:
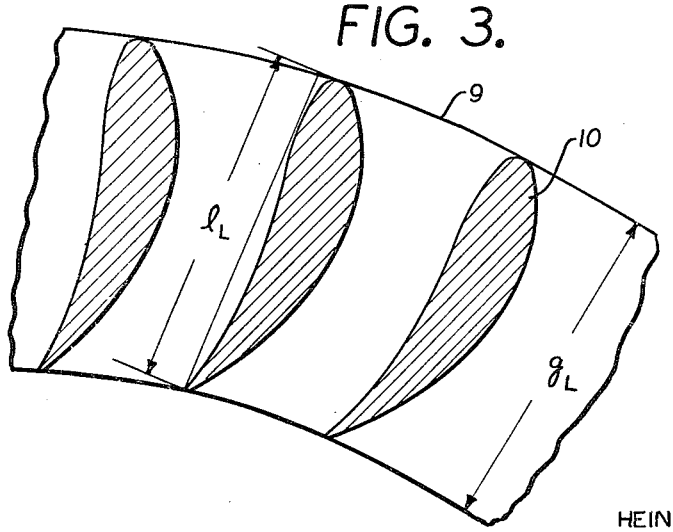
FIG. 3 is a section, on an enlarged scale, of the guide wheel grid with the guide blades along the lines 3—3 of FIG. 1.

Referring now to the drawings, and in particular to FIGS. 1 to 3, the hydraulic torque converter comprises a pump or impeller wheel 1, which carries a pump grid 2 with pum blades 3 and which is rigidly connected with a drive shaft 4. The pump grid 2 with the pump blades 3 is disposed in the radially outwardly passed portion of the flow circulation directly in front of the turbine grid 5 with the turbine vanes 6. The turbine grid 5 is carried by the turbine wheel 7, which is rigidly connected with an output shaft 8, disposed coaxially with the drive shaft 4. The guide wheel grid 9 with guide blades 10 is a part of the non-rotatable housing 11 of the converter and is passed through by the working fluid radially inwardly. The blade-free space between the guide wheel grid 9 and the pump or impeller grid 2 is divided into three ranges $a$, $b$ and $c$ and, in particular, $a$ provides the range of the blade-free space, the passing cross-sections of which are widened by the factor 1.03 to 1.05. $b$ designates the range of the cylindrical entrance branch following $a$ with a preferred length of 0.045D to 0.048D and $c$ indicates the blade-free space following up to the entrance of the pump or impeller grid 2 having constant passing cross-sections taken perpendicularly to an imaginary center line of the flow path. D is the characteristic diameter of the outlet edges of the blades of the impeller.

As can be ascertained from FIGS. 2 and 3, $l_P$ is the length of the pump blades 3, $l_T$ is the length of the turbine blades 6 and $l_L$ is the length of the guide vane 10. $g_P$ designates the grid width of the pump or impeller, $g_T$ the grid width of the turbine and $g_L$ the grid with of the guide wheel. If $z_P$, $z_T$ and $z_L$ indicates the number of blades in the pump, in the turbine, and in the guide wheel, respectively, in the corresponding grid, it results that The grid constant of the pump or impeller is
$$c_P = D/z_P \times l_P$$
The grid constant of the turbine is
$$c_T = D/z_T \times l_T$$
The grid constant of the guide wheel is
$$c_L = D/z_L \times l_L$$

Figure 4:
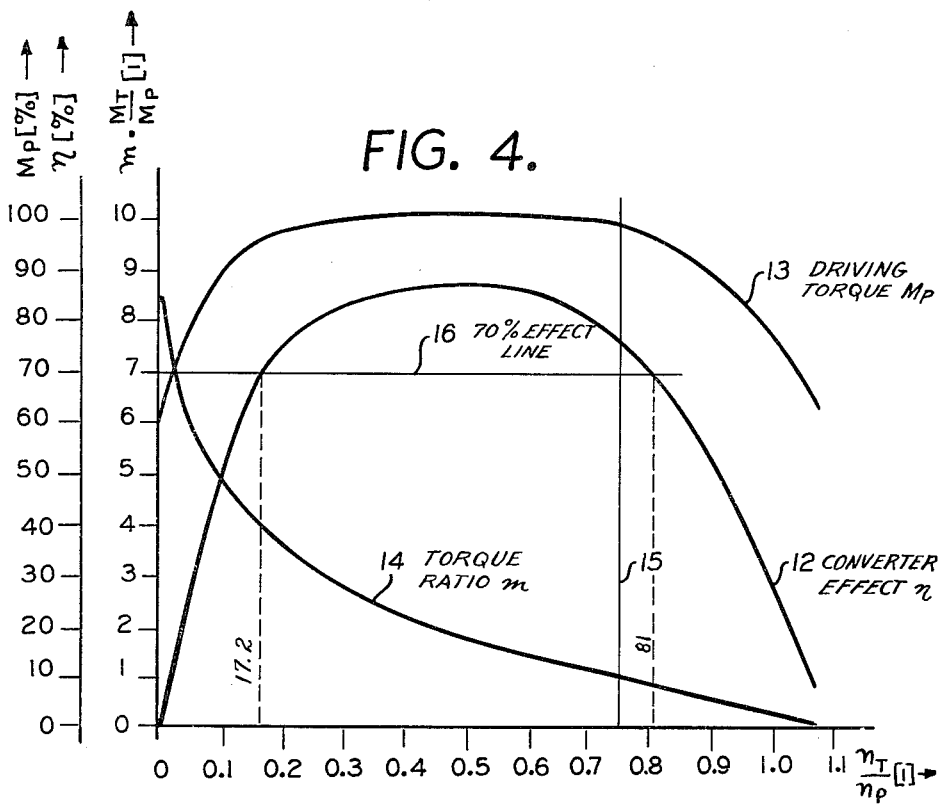
FIG. 4 is a schematic diagram depicting the characteristic curves of the hydraulic torque converter designed in accordance with the present invention.

Referring now again to the drawings, and in particular to FIG. 4, the shown diagrams depict the following characteristic curves on the hydraulic torque converter obtained in accordance with the above-stated characteristic values and combinations by measuring at constant numbers of revolutions $n_P$ of the drive, approximately true to measure above the ratio of the number of revolutions $(n_T/n_P)$ from the turbine and pump of the converter. It is:

Curve 12—
The characteristic of the converter effect $\eta$ in percentages,

Curve 13—
The characteristic of the driving torque $M_P$ in percentages taken by the pump grid 2, and Curve 14—
The characteristic of the output torque $M_T$ delivered by the turbine grid 5 related to the driving torque $M_P$, also the characteristic of the torque ratio $m = M_T/M_P$.

It can be ascertained from FIG. 4 that the characteristic curve 12 of the degree $\eta$ of the effect of the converter reaches its maximum value of 86% between the ratios of the number of revolutions $n_T/n_P = 0.4$ to 0.6, while the characteristic curve 13 of the driving torque $M_P$ increases from the ratio of the number of revolutions $n_T/n_P = 0$ to 0.2, then runs nearly constant up to the crossing point (on the line 15) and then is lowered again and that the characteristic curve 14 of the torque ratio $m$ reaches at the starting point $n_T/n_P = 0$ a maximum value of $m = 8.5$. Furthermore, it can be recognized that the 70%-effect curve 16 cuts the characteristic curve 12 at a ratio of the number of revolutions $n_T/n_P = 0.17$ and 0.8 and thus 0.8/0.17 brings about an operational efficiency of 4.706.

While I have disclosed one embodiment of the present invention, it is to be understood that this embodiment is given by example only and not in a limiting sense, the scope of the present invention being determined by the objects and the claims.

I claim:
1. A hydraulic torque converter, comprising
a housing having a central axis,
a single stage impeller member comprising a ring of impeller blades rotatable about said axis,
a single stage turbine member comprising a ring of turbine blades rotatable about said axis, and
a rotationally stationary guide member having a ring of guide blades concentric with said axis,
said housing and said members together providing a closed toroidal circuit having spaced inner and outer walls concentric with said axis for flow of working fluid therebetween,
said circuit comprising a radially extending outflow section,
a radially extending inflow section, and
curved bladeless inner and outer return bend sections connecting said outflow and inflow sections,
said ring of impeller blades and said ring of turbine blades being located in said outflow section with said turbine blades immediately adjacent and radially outwardly of said impeller blades, and
said ring of guide blades being located in said inflow section,
the radial extent of said blades being substantially the same in said inflow section and in said outflow section,
the inlet edges of said guid blades and the outlet edges of said turbine blades being located at substantially the same radius from said axis,
said inner return bend section being bladefree and comprising two curved portions and an intermediate cylindrical portion, and
said inner return bend section having a cross-section widening from the outlet edge of said guide blades to the start of said cylindrical portion, and remaining substantially constant to the inlet edge of said impeller blades, said bladefree inner return bend section being part of the range of said ring of impeller blades and turning with the latter, so that the flow of said working fluid reaches the inlet edge of said impeller blades already with a twist, the radial outer wall of said inner return bend section being coordinated over its entire range from the outlet edge of said guide blades to said ring of said impeller blades, while the inner radial wall of said inner return bend section being coordinated to said ring of impeller blades from the outlet edge of said guides blades to short before reaching said cylindrical section, so that the entrance cross-section of said blade-free inner return bend section rotating with said ring of impeller blades is disposed substantially perpendicular relative to said central axis,
the inner and outer walls of said inflow section and of said outflow section being disposed perpendicular to said central axis and the radial distance thereof being chosen such that the cross-sectional area of said outflow section and of said inflow section in front of the inlet edges of said impeller blades and in front of the outlet edges of said guide blades, respectively, being disposed perpendicular to said walls of said inflow section and of said outflow section, respectively, and parallel to said central axis, respectively, the width of the flow path in said outflow section at the inlet edges of said impeller blades being equal to the cross-sectional area of the constant portion of said outflow section, while the width of the flow path of said inflow section at the outlet edges of said guide blades being equal to the width of the flow path of said outer blade-free return bend section at the inlet edges of said guide blades, the width of the flow path being widened at the outlet edges of said impeller blades and having substantially the same value as on the outlet edges of said turbine blades, said outer return bend section comprising two curved portions and a conical portion, and the width of the flow path of said outer return bend section from said outflow section towards said inflow section equally diminishing until reaching at the inlet edges of said guide blades the same value as the width of the flow path at the outlet edges of said guide blades, said outer bladefree return bend section being coordinated over its entire range to said guide blades and being non-rotatable, said turbine blades having thick and bluntly rounded inlet edges and a strongly curved camber line, said guide blades having bluntly rounded inlet edges and a slightly curved camber line, the diameter of the outlet edges of said impeller blades constituting the characteristic diameter D, the distance between the inner wall and the outer wall of said inflow section being equal to about 0.111D, and the distance between the inner wall and the outer wall of said outflow section within the range of said impeller blades being equal to about 0.114D and within the range of said turbine blades being equal to about 0.12D.

2. The hydraulic torque converter, as set forth in claim 1, wherein said impeller member has a grid constant $c_P = 0.31$ to 0.32, said turbine member has a grid constant $c_T = 0.30$ to 0.31, said guide member has a grid constant $c_L = 0.18$ to 0.20 in combination with said bladeless inner return bend section between said guide member and said impeller member, the width of the flow path of said inner return bend section is widened equally up to said cylindrical portion thereof to about 1.03 up to 1.05 of its starting value, while said width of the flow path remains constant in sections disposed perpendicularly to an imaginary center line extending through said flow path up to the inlet edges of said impeller blades.

3. The hydraulic torque converter, as set forth in claim 1, wherein said impeller member has a grid width $g_P = 0.095D$ to $0.105D$.

said turbine member had a grid width $g_T = 0.49D$ to $0.053D$, and said guide member had a grid with $g_L = 0.159D$ to $0.163D$.

4. The hydraulic torque converter, as set forth in claim 1, wherein the width of the flow path of said bladeless outer return bend section diminishes equally from the outlet edges of said turbine blades to the inlet edges of said guide blades to 0.925 of the starting value.

5. The hydraulic torque converter, as set forth in claim 1, wherein the cylindrical portion of said bladeless inner return section has an axial length of about 0.045D to 0.048D.

References Cited by the Examiner

UNITED STATES PATENTS 3,016,709   1/62   Lysholm _____ 60—54

JULIUS E. WEST, *Primary Examiner*.